United States Patent
Ogawa et al.

(10) Patent No.: US 8,926,919 B2
(45) Date of Patent: Jan. 6, 2015

(54) CARBON DIOXIDE SEPARATION AND RECOVERY APPARATUS

(75) Inventors: Takashi Ogawa, Yokohama (JP); Manabu Sakurai, Chigasaki (JP); Yukio Ohashi, Yokohama (JP); Hideo Kitamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 349 days.

(21) Appl. No.: 13/505,158

(22) PCT Filed: Nov. 4, 2010

(86) PCT No.: PCT/JP2010/069613
§ 371 (c)(1),
(2), (4) Date: Apr. 30, 2012

(87) PCT Pub. No.: WO2011/068007
PCT Pub. Date: Jun. 9, 2011

(65) Prior Publication Data
US 2012/0230875 A1   Sep. 13, 2012

(30) Foreign Application Priority Data
Dec. 2, 2009 (JP) ................................. 2009-274399

(51) Int. Cl.
*B01J 8/02* (2006.01)
*C02F 1/20* (2006.01)
(Continued)

(52) U.S. Cl.
CPC .............. *B01D 53/1425* (2013.01); *C02F 1/20* (2013.01); *Y02C 10/04* (2013.01);
(Continued)

(58) Field of Classification Search
CPC ................ B01J 8/00; B01J 8/02; B01J 19/00; B01J 19/24; B01D 45/00; B01D 53/00; B01D 53/14; B01D 53/1425; B01D 53/1456; B01D 53/1475; B01D 53/34; B01D 53/46; B01D 53/62
USPC .......... 422/129, 187, 211, 223; 423/210, 220, 423/230
See application file for complete search history.

(56) References Cited

U.S. PATENT DOCUMENTS 4,804,522 A * 2/1989 Hass .............................. 423/235
6,174,506 B1   1/2001 Chakravarti et al.
(Continued)

FOREIGN PATENT DOCUMENTS

CN   1887405 A   1/2007
CN   1973958 A   6/2007
(Continued)

OTHER PUBLICATIONS

Machine translation of JP 08-089756A, which was provided with IDS filed Apr. 30, 2012 and published Apr. 9, 1996.*
(Continued)

*Primary Examiner* — Natasha Young
(74) *Attorney, Agent, or Firm* — Harness, Dickey & Pierce, P.L.C.

(57) ABSTRACT

After absorbing oxygen together with carbon dioxide in an absorber 103, absorbing liquid 104a is supplied to oxygen collecting units 13 and 14. The oxygen collecting units 13 and 14 include silver to collect the oxygen in the absorbing liquid 104a and eliminate the oxygen from the absorbing liquid 104a. A regenerating unit 15 separates and recovers the oxygen collected in one of the two oxygen collecting units 13 and 14 to regenerate the oxygen collecting unit when the other oxygen collecting unit is supplied with the absorbing liquid 104a. A continuous operation can be achieved by switching and using the two oxygen collecting units 13 and 14.

14 Claims, 9 Drawing Sheets

(51) Int. Cl.
  *C01B 31/04* (2006.01)
  *C02F 1/22* (2006.01)
  *B01J 19/00* (2006.01)
  *B01J 19/24* (2006.01)
  *B01D 53/00* (2006.01)
  *B01D 53/14* (2006.01)
  *B01D 53/34* (2006.01)
  *B01D 53/46* (2006.01)
  *B01D 53/62* (2006.01)
  *C02F 103/18* (2006.01)

(52) U.S. Cl.
  CPC ......... *C01B 31/0438* (2013.01); *C02F 2103/18* (2013.01); *C01B 2204/04* (2013.01); *C02F 1/22* (2013.01); *B01D 53/1475* (2013.01); *Y02C 10/06* (2013.01)
  USPC ........... 422/223; 422/129; 422/128; 422/211; 423/210; 423/220; 423/230

(56) References Cited

U.S. PATENT DOCUMENTS

| | | | |
|---|---|---|---|
| 6,592,829 | B2 | 7/2003 | Chakravarti et al. |
| 6,883,327 | B2 | 4/2005 | Iijima et al. |
| 8,147,593 | B2 | 4/2012 | Mimura et al. |
| 2001/0026779 | A1 | 10/2001 | Chakravarti et al. |
| 2004/0221578 | A1 | 11/2004 | Iijima et al. |
| 2007/0148069 | A1* | 6/2007 | Chakravarti et al. .......... 423/220 |
| 2008/0078292 | A1 | 4/2008 | Mimura et al. |

FOREIGN PATENT DOCUMENTS

| | | |
|---|---|---|
| JP | 01-290517 A | 11/1989 |
| JP | 08-089756 A | 4/1996 |
| JP | 2001-019416 A | 1/2001 |
| JP | 2004-323339 A | 11/2004 |
| JP | 2007-137725 A | 6/2007 |
| JP | 2010-069371 A | 4/2010 |
| WO | WO2006/107026 A1 | 10/2006 |

OTHER PUBLICATIONS

Extended European Search Report issued on Nov. 7, 2013 in corresponding European Application No. 10834460, corresponding to PCT/JP2010/069613 and this application.

Australian Office Action issued on Jan. 16, 2013 to Australian Application No. 2010327767, corresponding to the instant U.S. Application.

International Search Report for PCT/JP2010/069613, ISA/JP, mailed Feb. 1, 2011.

International Preliminary Report on Patentability (Chapter I) for PCT/JP2010/069613-English translation.

Chinese Office Action issued on Jan. 24, 2014 in related Chinese application No. 201080054558.8 with English translation.

Chinese Office Action issued on Jul. 11, 2014 in related Chinese application No. 201080054558.8 with English translation.

Extended European Search Report dated Sep. 8, 2014 in related EP Application No. 14171712.

* cited by examiner

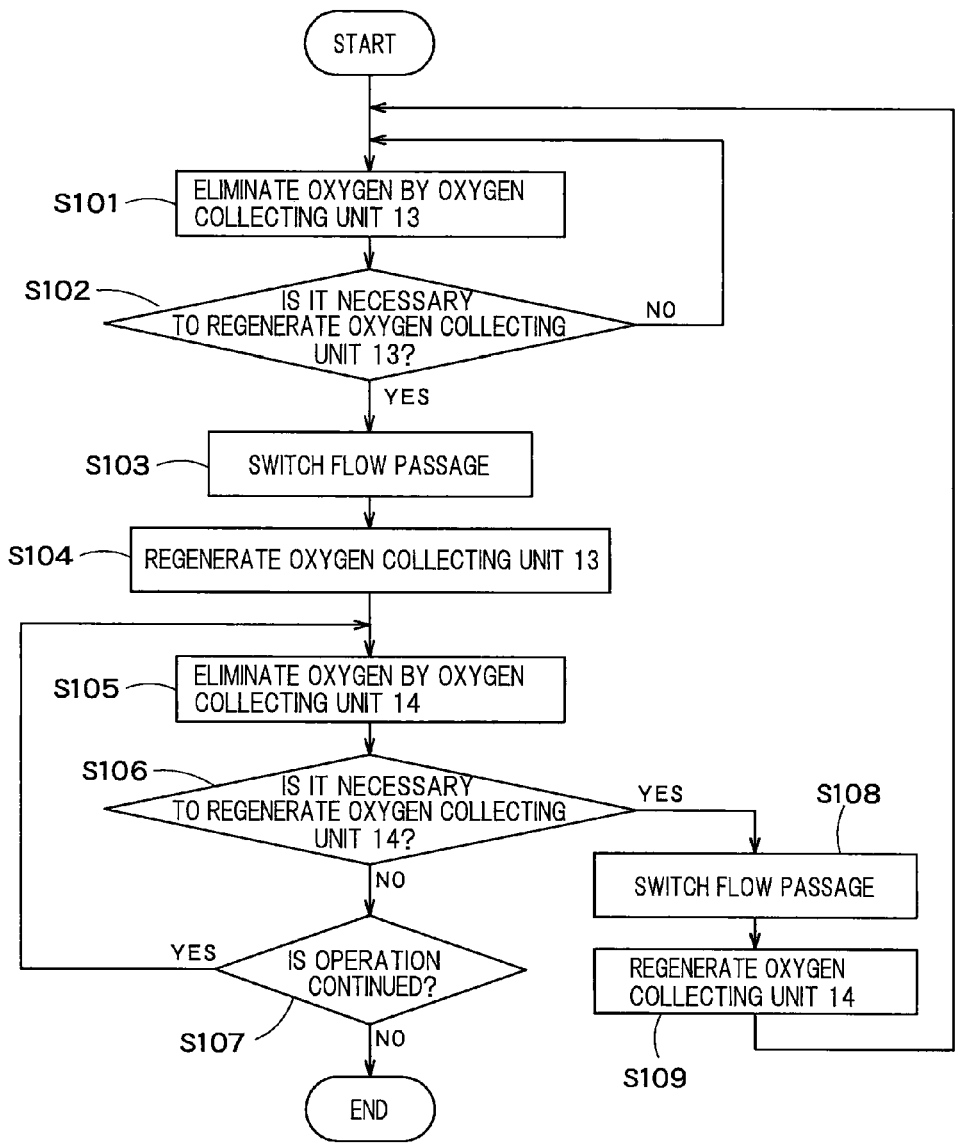
F I G. 2

(a)
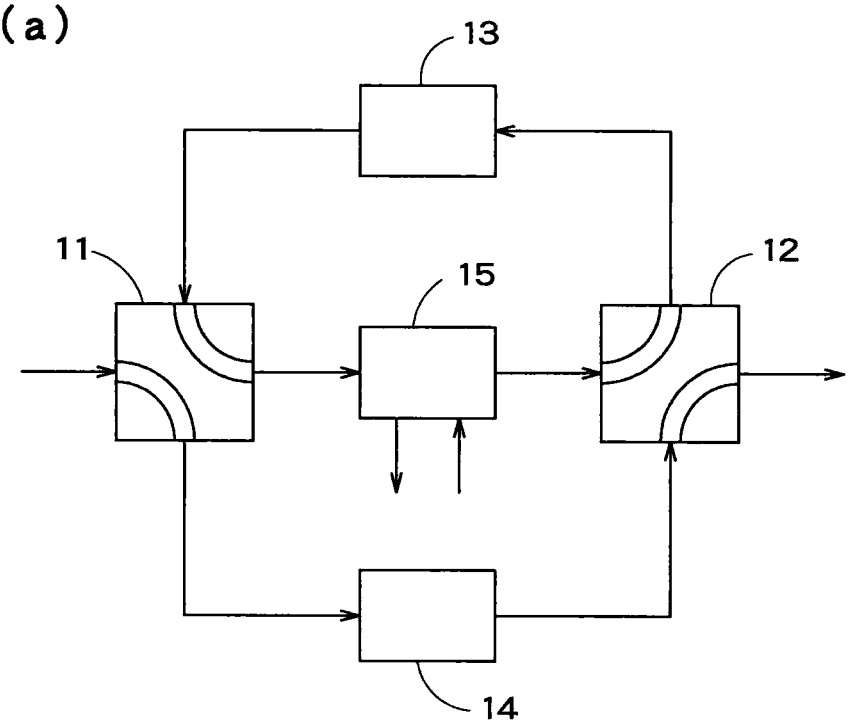
(b)
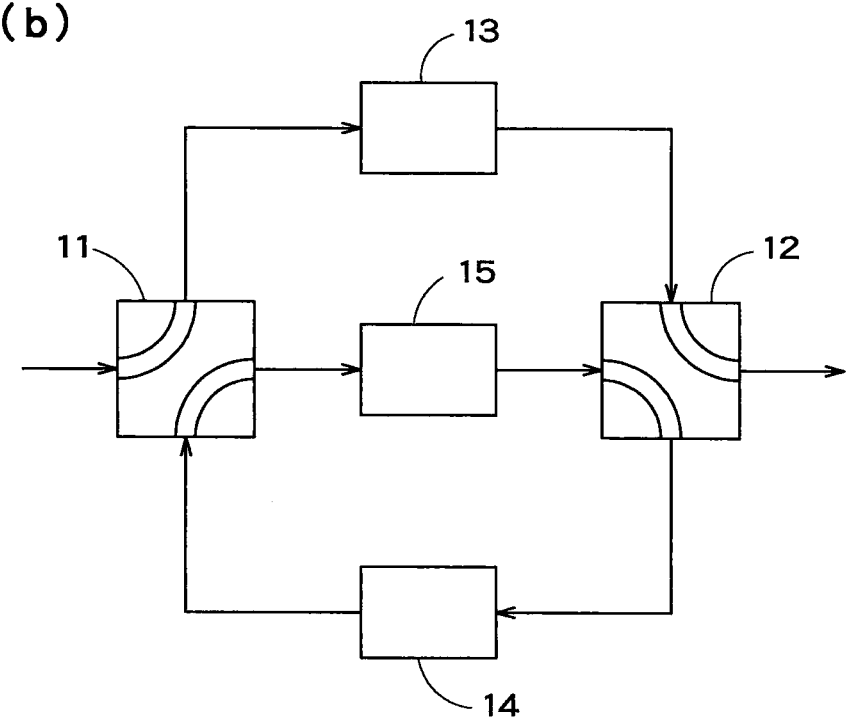
F I G. 3

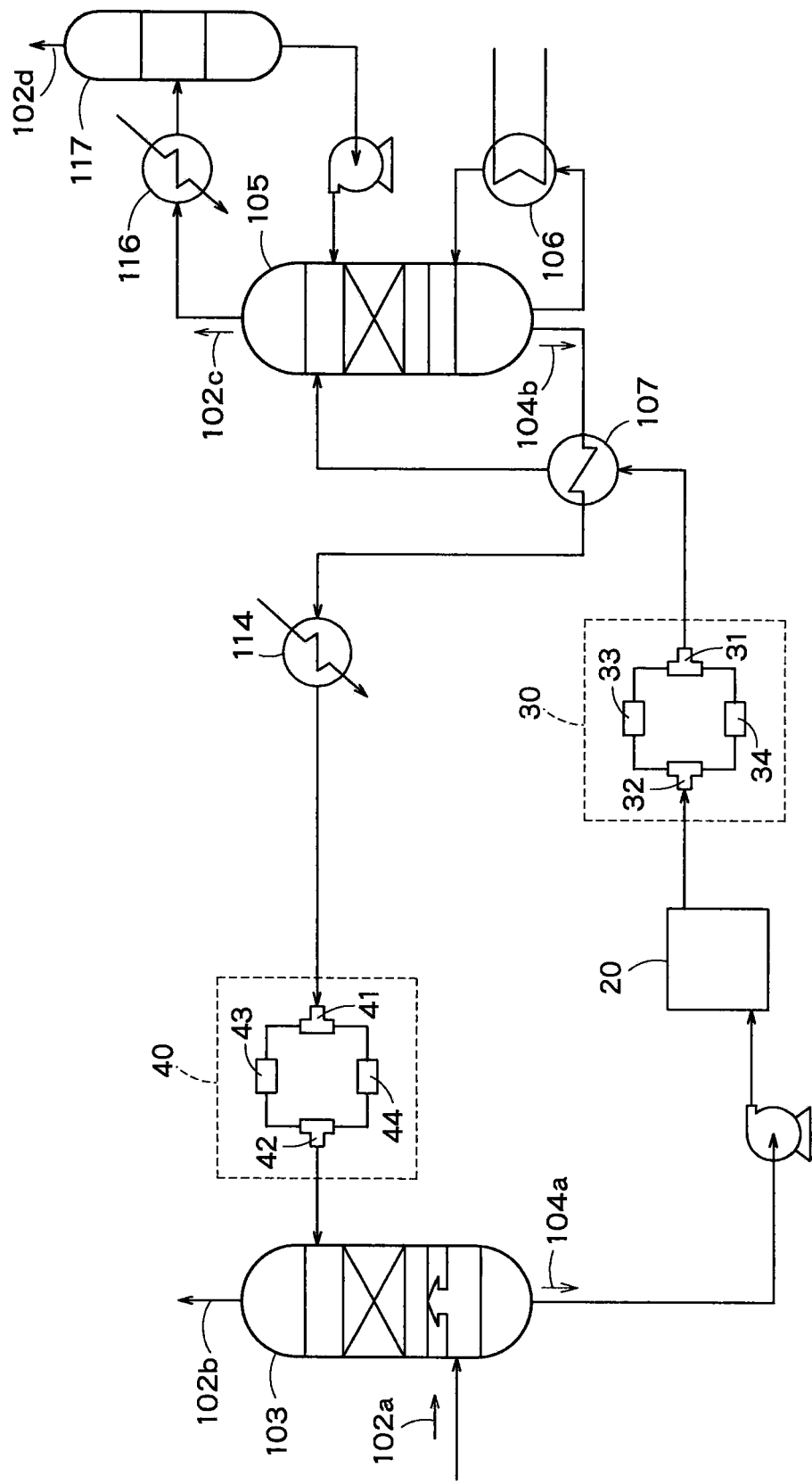
F I G. 7

US 8,926,919 B2

CARBON DIOXIDE SEPARATION AND RECOVERY APPARATUS

CROSS-REFERENCE TO RELATED APPLICATIONS

This application is a 371 U.S. National Stage of International Application No. PCT/JP2010/069613, filed Nov. 4, 2010. This application claims the benefit of Japanese Patent Application No. 2009-274399, filed Dec. 2, 2009. The disclosures of the above applications are incorporated herein by reference.

TECHNICAL FIELD

The present invention relates to a carbon dioxide separation and recovery apparatus.

BACKGROUND ART

In recent years, methods intended for a thermal power plant or the like that uses a lot of fossil fuel have been studied, i.e., a method for separating and recovering carbon dioxide from exhaust combustion gas by bringing the exhaust combustion gas into contact with amine absorbing liquid and a method for storing the recovered carbon dioxide without releasing the carbon dioxide into the air.

Specifically, a carbon dioxide recovery apparatus including an absorber and a regenerator is known. The absorber makes the amine absorbing liquid absorb the carbon dioxide contained in the exhaust combustion gas. After the absorbing liquid that has absorbed the carbon dioxide (rich liquid) is supplied from the absorber to the regenerator, the regenerator heats the rich liquid to release the carbon dioxide gas from the rich liquid, thereby regenerating the absorbing liquid (for example, refer to Patent Document 1).

The exhaust combustion gas contains oxygen and sulfur dioxide, which are absorbed together with the carbon dioxide into the absorbing liquid at the absorber. There is a problem in that the absorbing liquid that has absorbed the oxygen and the sulfur dioxide is deteriorated, and the performance of carbon dioxide absorption thereof is decreased.

Patent Document 1: Japanese Patent Application Laid-Open No. 2004-323339

SUMMARY OF THE INVENTION

Problems to be Solved by the Invention

In order to solve the above-described problem, an object of the present invention is to provide a carbon dioxide separation and recovery apparatus preventing the absorbing liquid from having a decreased performance of carbon dioxide absorption.

Solutions to the Problems

According to one aspect of the present invention, there is provided a carbon dioxide separation and recovery apparatus comprises an absorber making absorbing liquid absorb carbon dioxide contained in exhaust combustion gas, and discharging the absorbing liquid containing the carbon dioxide, a regenerator supplied with the absorbing liquid discharged from the absorber, eliminating carbon dioxide gas containing steam from the absorbing liquid, and regenerating and discharging the absorbing liquid, a regenerated heat exchanger placed between the absorber and the regenerator and using the absorbing liquid discharged from the regenerator and supplied to the absorber as a heat source to heat the absorbing liquid discharged from the absorber and supplied to the regenerator, and an oxygen eliminating unit eliminating oxygen from the absorbing liquid supplied from the absorber to the regenerator. The oxygen eliminating unit includes a first collecting unit and a second collecting unit collecting the oxygen contained in the absorbing liquid, a first flow passage switching unit supplying the absorbing liquid discharged from the absorber to the first collecting unit or the second collecting unit, a second flow passage switching unit supplying the absorbing liquid discharged from the first collecting unit or the second collecting unit to the regenerated heat exchanger, and a regenerating unit recovering the oxygen collected in the second collecting unit in the case where the first flow passage switching unit supplies the first collecting unit with the absorbing liquid, and recovering the oxygen collected in the first collecting unit in the case where the first flow passage switching unit supplies the second collecting unit with the absorbing liquid.

According to one aspect of the present invention, there is provided a carbon dioxide separation and recovery apparatus comprises an absorber making absorbing liquid absorb carbon dioxide contained in exhaust combustion gas, and discharging the absorbing liquid containing the carbon dioxide, a regenerator supplied with the absorbing liquid discharged from the absorber, eliminating carbon dioxide gas containing steam from the absorbing liquid, and regenerating and discharging the absorbing liquid, a regenerated heat exchanger placed between the absorber and the regenerator and using the absorbing liquid discharged from the regenerator and supplied to the absorber as a heat source to heat the absorbing liquid discharged from the absorber and supplied to the regenerator, a reactor placed between the absorber and the regenerated heat exchanger, storing the absorbing liquid supplied from the absorber to the regenerator, and generating a sulfate ion by a reaction of the oxygen contained in the absorbing liquid with a sulfite ion, a first eliminating unit eliminating the sulfate ion from the absorbing liquid containing the sulfate ion, and a second eliminating unit placed between the regenerated heat exchanger and the absorber, and eliminating an organic acid anion from the absorbing liquid discharged from the regenerator and having the sulfate ion eliminated therefrom.

According to one aspect of the present invention, there is provided a carbon dioxide separation and recovery apparatus comprises an absorber making absorbing liquid absorb carbon dioxide contained in exhaust combustion gas, and discharging the absorbing liquid containing the carbon dioxide, a regenerator supplied with the absorbing liquid discharged from the absorber, eliminating carbon dioxide gas containing steam from the absorbing liquid, and regenerating and discharging the absorbing liquid, a regenerated heat exchanger placed between the absorber and the regenerator and using the absorbing liquid discharged from the regenerator and supplied to the absorber as a heat source to heat the absorbing liquid discharged from the absorber and supplied to the regenerator, a reactor placed between the absorber and the regenerated heat exchanger, storing the absorbing liquid supplied from the absorber to the regenerator, and generating a sulfate ion by a reaction of the oxygen contained in the absorbing liquid with a sulfite ion, a first eliminating unit eliminating the sulfate ion from the absorbing liquid containing the sulfate ion, a second eliminating unit placed between the regenerated heat exchanger and the absorber, and eliminating an organic acid anion from the absorbing liquid discharged from the regenerator and having the sulfate ion eliminated therefrom, and a third eliminating unit. The third eliminating unit includes a first collecting unit and a second collecting unit collecting the oxygen contained in the absorbing liquid discharged from the reactor, a first flow passage switching unit supplying the first collecting unit or the second collecting unit with the absorbing liquid discharged from the reactor, a second flow passage switching unit supplying the regenerated heat exchanger with the absorbing liquid discharged from the first collecting unit or the second collecting unit, and a regenerating unit recovering the oxygen collected in the second collecting unit in the case where the first flow passage switching unit supplies the first collecting unit with the absorbing liquid, and recovering the oxygen collected in the first collecting unit in the case where the first flow passage switching unit supplies the second collecting unit with the absorbing liquid.

Effects of the Invention

According to the present invention, absorbing liquid can be prevented from having a decreased performance of carbon dioxide absorption.

BRIEF DESCRIPTION OF THE DRAWINGS

FIG. 2 is a flowchart describing a method for eliminating oxygen according to the first embodiment of the present invention.

FIGS. 3(a) and 3(b) are views showing an example of the switching of flow passages in an oxygen eliminating unit.

FIG. 7 is a schematic configuration diagram of a modification of the carbon dioxide separation and recovery apparatus.

MODE FOR CARRYING OUT THE INVENTION

Hereafter, the embodiments of the present invention will be described with reference to the drawings.

First Embodiment

Figure 1:
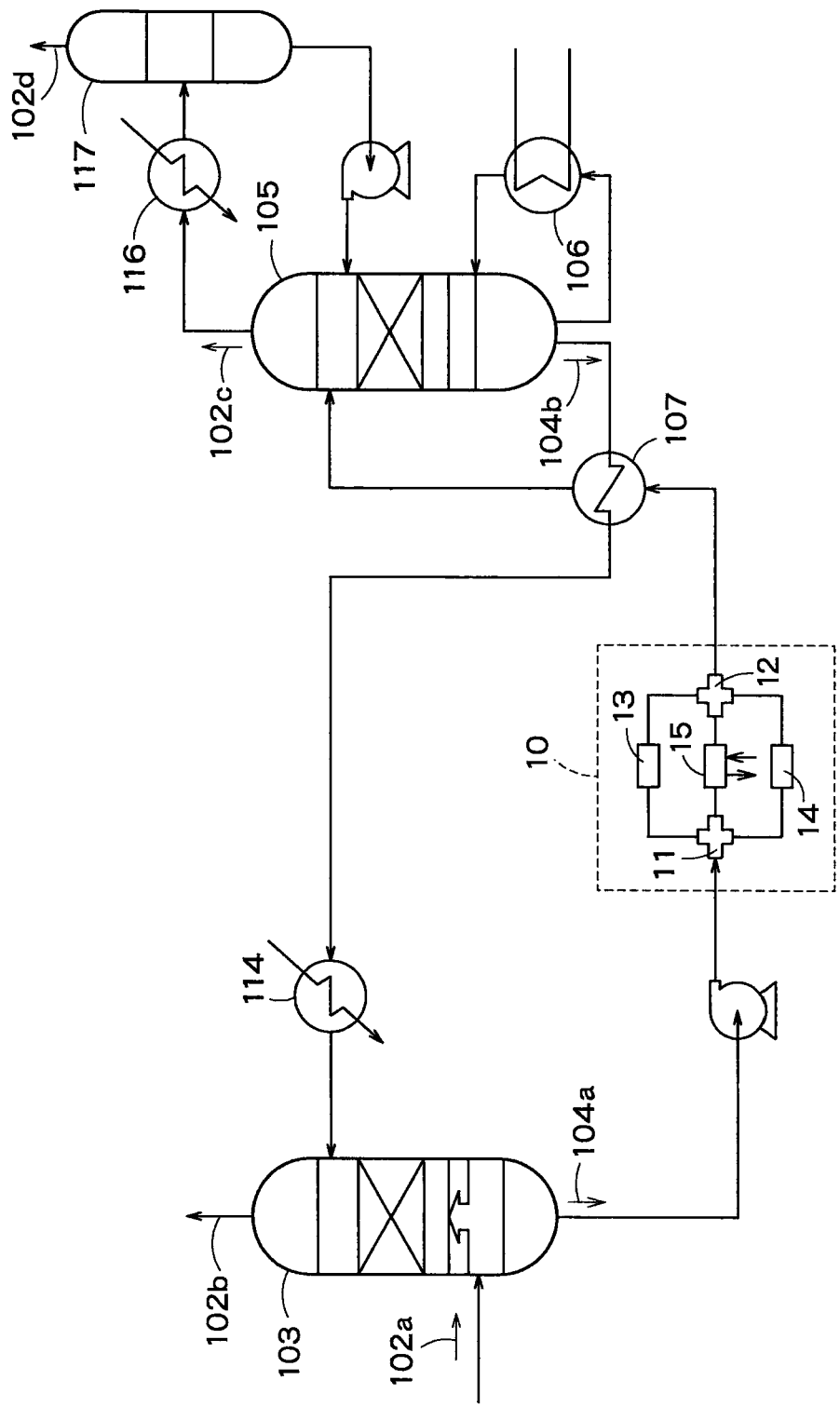
FIG. 1 is a schematic configuration diagram of a carbon dioxide separation and recovery apparatus according to a first embodiment of the present invention.

FIG. 1 is a schematic configuration diagram of a carbon dioxide separation and recovery apparatus according to the first embodiment of the present invention. Here, the carbon dioxide separation and recovery apparatus recovers, by using absorbing liquid capable of absorbing carbon dioxide, carbon dioxide contained in the exhaust combustion gas generated in the combustion of fossil fuel. For example, amine compound aqueous solution in which amine compound is dissolved in water is used as the absorbing liquid capable of absorbing carbon dioxide.

As shown in FIG. 1, a carbon dioxide separation and recovery apparatus 1 includes an oxygen eliminating unit 10, an absorber (an absorption column) 103, a regenerator (a regeneration column) 105, a reboiler 106, a regenerated heat exchanger 107, a cooler 114, a gas cooler 116 and a condenser 117.

The absorber 103 makes absorbing liquid absorb carbon dioxide contained in exhaust combustion gas 102a. The regenerator 105 regenerates absorbing liquid by receiving, from the absorber 103, the absorbing liquid that has absorbed the carbon dioxide (hereinafter, referred to as rich liquid 104a), heating the rich liquid 104a to release carbon dioxide gas containing steam from the absorbing liquid, and discharging exhaust gas 102c containing the carbon dioxide gas and steam.

The exhaust combustion gas 102a is supplied to the lower side of the absorber 103 and exhaust combustion gas 102b from which the carbon dioxide has been removed is discharged from the top of the absorber 103. The exhaust combustion gas 102a has been generated in a power plant such as a thermal power plant.

The reboiler 106 heats a part of lean liquid 104b that has been stored in the regenerator 105 to raise the temperature and generate steam, and then supplies the regenerator 105 with the steam. Note that, when the lean liquid 104b is heated in the reboiler 106, a small amount of carbon dioxide gas is released from the lean liquid 104b and is supplied together with the steam to the regenerator 105. Then, the steam heats the rich liquid 104a in the regenerator 105 so that the carbon dioxide gas is released.

The regenerated heat exchanger 107 is placed between the absorber 103 and the regenerator 105 and is configured to recover the heat of the lean liquid 104b. The regenerated heat exchanger 107 heats the rich liquid 104a supplied from the absorber 103 to the regenerator 105 using the lean liquid 104b supplied from the regenerator 105 to the absorber 103 as a heat source. The lean liquid 104b from the regenerated heat exchanger 107 is cooled by the cooler 114 and is supplied to the upper side of the absorber 103.

In the absorber 103, the lean liquid 104b supplied to the upper side of the absorber 103 descends from the upper side whereas the exhaust combustion gas 102a supplied to the absorber 103 ascends from the lower side to the top of the absorber 103. Accordingly, the exhaust combustion gas 102a containing carbon dioxide countercurrently (directly) comes into contact with the lean liquid 104b so that the carbon dioxide is removed from the exhaust combustion gas 102a and absorbed into the lean liquid 104b. Thus, the rich liquid 104a is generated. The exhaust combustion gas 102b from which the carbon dioxide has been removed is discharged from the top of the absorber 103.

As the carbon dioxide in the exhaust combustion gas 102a is absorbed into the lean liquid 104b in the absorber 103, oxygen is also absorbed. Accordingly, the rich liquid 104a contains the oxygen. The oxygen eliminating unit 10 is configured to eliminate the dissolved oxygen in the rich liquid 104a and will be described in detail below.

The gas cooler 116 cools the exhaust gas 102c discharged from the regenerator 105 by using cooling water (cooling medium) and supplies the exhaust gas to the condenser 117.

The condenser 117 condenses (cools) the exhaust gas 102c to separate carbon dioxide gas from the produced condensed liquid. Carbon dioxide gas 102d that has been discharged from the condenser 117 is stored in a storage unit (not shown).

The condensed liquid from the condenser 117 is supplied to the upper side of the regenerator 105.

Next, the configuration of the oxygen eliminating unit 10 will be described. The oxygen eliminating unit 10 includes flow passage switching units 11 and 12, oxygen collecting units 13 and 14, and a regenerating unit 15.

The oxygen collecting units 13 and 14 adsorb the oxygen from the rich liquid 104a to eliminate the oxygen from the rich liquid 104a. The rich liquid 104a from which the oxygen has been eliminated is sent to the regenerated heat exchanger 107 through the flow passage switching unit 12.

The oxygen collecting units 13 and 14 can include, for example, porous silver. Using the porous silver causes a reaction: $2Ag+O_2 \rightarrow Ag_2O$ and the oxygen is eliminated from the rich liquid 104a.

The regenerating unit 15 separates and recovers the oxygen collected in the oxygen collecting units 13 and 14 to regenerate the oxygen collecting unit 13. For example, when the regenerating unit 15 regenerates the oxygen collecting unit 13 including porous silver, the regenerating unit 15 first collects liquid (absorbing liquid) in the oxygen collecting unit 13. The regenerating unit 15 discharges the collected absorbing liquid into, for example, a tank provided outside (not shown). The regenerating unit 15 discharges all the collected absorbing liquid to the outside and then supplies the oxygen collecting unit 13 with the steam, $N_2$, $CO_2$ and the like that have been supplied from outside and have a high temperature (about 200° C.). Note that in the description below, the steam, $N_2$, $CO_2$ and the like that are supplied from the regenerating unit 15 to the oxygen collecting unit 13 (14) are merely called a gas. In the oxygen collecting unit 13, a reaction: $Ag_2O \rightarrow 2Ag+O_2$ occurs to separate oxygen. The separated oxygen is recovered together with the gas supplied from the regenerating unit 15 into the regenerating unit 15. This regenerates the porous silver of the oxygen collecting unit 13. The porous silver of the oxygen collecting unit 14 is regenerated in the same way. The regenerating unit 15 discharges the gas containing oxygen and collected from the oxygen collecting units 13 and 14 to the outside.

A heater can be provided to the oxygen collecting units 13 and 14 to cause the reaction: $Ag_2O \rightarrow 2Ag+O_2$ by heating the heater so as to separate oxygen from the porous silver. Supplying the gas from the regenerating unit 15 can be started either before heating by the heater or after the heating. The oxygen that has been separated from the porous silver of the oxygen collecting units 13 and 14 is recovered into the regenerating unit 15, together with the gas supplied from the regenerating unit 15. Note that, when a heater is provided to the oxygen collecting units 13 and 14, the gas supplied from the regenerating unit 15 to the oxygen collecting units 13 and 14 does not have to have a high temperature because the gas is only for recovering the oxygen separated from the porous silver.

When the regenerating unit 15 regenerates the oxygen collecting unit 13, the rich liquid 104a is supplied to the regenerator 105 through the flow passage switching unit 11, the oxygen collecting unit 14, and the flow passage switching unit 12. At that time, the gas is supplied from the regenerating unit 15 to the oxygen collecting unit 13 through the flow passage switching unit 12 and the liquid and gas discharged from the oxygen collecting unit 13 are recovered into the regenerating unit 15 through the flow passage switching unit 11.

On the other hand, when the regenerating unit 15 regenerates the oxygen collecting unit 14, the rich liquid 104a is supplied to the regenerator 105 through the flow passage switching unit 11, the oxygen collecting unit 13, and the flow passage switching unit 12. At that time, the gas is supplied from the regenerating unit 15 to the oxygen collecting unit 14 through the flow passage switching unit 12 and the liquid and the gas discharged from the oxygen collecting unit 14 are recovered into the regenerating unit 15 through the flow passage switching unit 11.

For example, a four-way valve can be used as the flow passage switching units 11 and 12.

An example of the processes for eliminating oxygen from the rich liquid 104a in the oxygen eliminating unit 10 and for regenerating the oxygen collecting units 13 and 14 will be described with reference to FIG. 2 showing a flowchart and FIG. 3 showing the switching destinations of the flow passage switching units 11 and 12.

(Step S101) The oxygen collecting unit 13 is supplied with the rich liquid 104a to eliminate the oxygen.

(Step S102) Whether the oxygen collecting unit 13 is regenerated is determined. For example, in the case where a predetermined time has elapsed from supplying the oxygen collecting unit 13 with the rich liquid 104a, the oxygen collecting unit 13 is considered as having a decreased performance of oxygen adsorption. Accordingly, it is determined that the oxygen collecting unit 13 is regenerated. When the regeneration is conducted, the process goes to step S103. When the regeneration is not needed, the process goes back to step S101.

(Step S103) The flow passages of the flow passage switching units 11 and 12 are switched. As shown in FIG. 3(a), the flow passage switching unit 11 supplies the oxygen collecting unit 14 with the rich liquid 104a and supplies the regenerating unit 15 with the liquid and gas discharged from the oxygen collecting unit 13.

Meanwhile, the flow passage switching unit 12 supplies the oxygen collecting unit 13 with the gas and the like supplied from the regenerating unit 15 and supplies the regenerated heat exchanger 107 with the rich liquid 104a discharged from the oxygen collecting unit 14.

(Step S104) The oxygen collecting unit 13 is regenerated. For example, the absorbing liquid remaining in the oxygen collecting unit 13 is recovered into the regenerating unit 15. After discharging, to the outside, all the absorbing liquid that has been recovered from the oxygen collecting unit 13, the regenerating unit 15 supplies the oxygen collecting unit 13 with the high-temperature gas supplied from the outside. The high-temperature gas separates oxygen from the porous silver in the oxygen collecting unit 13. The separated oxygen is recovered together with the gas into the regenerating unit 15.

(Step S105) The oxygen collecting unit 14 is supplied with the rich liquid 104a to eliminate the oxygen.

(Step S106) Whether the oxygen collecting unit 14 is regenerated is determined. When the regeneration is conducted, the process goes to step S108. When the regeneration is not needed, the process goes back to step S107.

(Step S107) When the carbon dioxide separation and recovery apparatus 1 continues to operate, the process goes back to step S105.

(Step S108) The flow passages of the flow passage switching units 11 and 12 are switched. As shown in FIG. 3(b), the flow passage switching unit 11 supplies the oxygen collecting unit 13 with the rich liquid 104a and supplies the regenerating unit 15 with the liquid and gas discharged from the oxygen collecting unit 14.

Meanwhile, the flow passage switching unit 12 supplies the oxygen collecting unit 14 with the gas and the like supplied from the regenerating unit 15 and supplies the regenerated heat exchanger 107 with the rich liquid 104a discharged from the oxygen collecting unit 13.

(Step S109) The oxygen collecting unit 14 is regenerated. For example, the absorbing liquid remaining in the oxygen collecting unit 14 is recovered into the regenerating unit 15. After discharging, to the outside, all the absorbing liquid that has been recovered from the oxygen collecting unit 14, the regenerating unit 15 supplies the oxygen collecting unit 14 with the high-temperature gas supplied from the outside. The high-temperature gas separates oxygen from the porous silver in the oxygen collecting unit 14. The separated oxygen is recovered together with the gas into the regenerating unit 15.

In such a manner, oxygen can be eliminated from the absorbing liquid circulating through the carbon dioxide separation and recovery apparatus 1 so that the absorbing liquid can be prevented from having a decreased performance of carbon dioxide absorption. Further, one of the two oxygen collecting units 13 and 14 is used while the other is regenerated so that the oxygen collecting unit can be regenerated while the operation is continued.

When the regenerating unit 15 supplies the oxygen collecting units 13 and 14 with a high-temperature water vapor, the high-temperature water vapor can be received from the reboiler 106. When the high-temperature water vapor contains impurities, the oxygen collecting units 13 and 14 can be rinsed out with purified water after eliminating oxygen therefrom.

Further, the regenerating unit 15 can include a boiler for generating high-temperature water vapor and supply the oxygen collecting units 13 and 14 with the high-temperature water vapor.

Not only a porous silver but also, for example, a sintered silver granule, a stainless steel mesh having a silver-plated surface, and a material remaining after a urethane foam has been silver-plated and then the urethane foam has been eliminated therefrom can be used as the oxygen collecting units 13 and 14. When the silver is dissolved from the oxygen collecting units 13 and 14, it is preferable to provide, for example, a cation-exchange resin capable of eliminating the silver from the absorbing liquid between the oxygen eliminating unit 10 and the regenerator 105.

Not only silver but also a material that easily adsorbs oxygen and does not affect the absorbing liquid can be used as the oxygen collecting units 13 and 14. For example, an iron fiber can be used. An iron fiber that has fully adsorbed oxygen can be changed into a new iron fiber.

Figure 4:
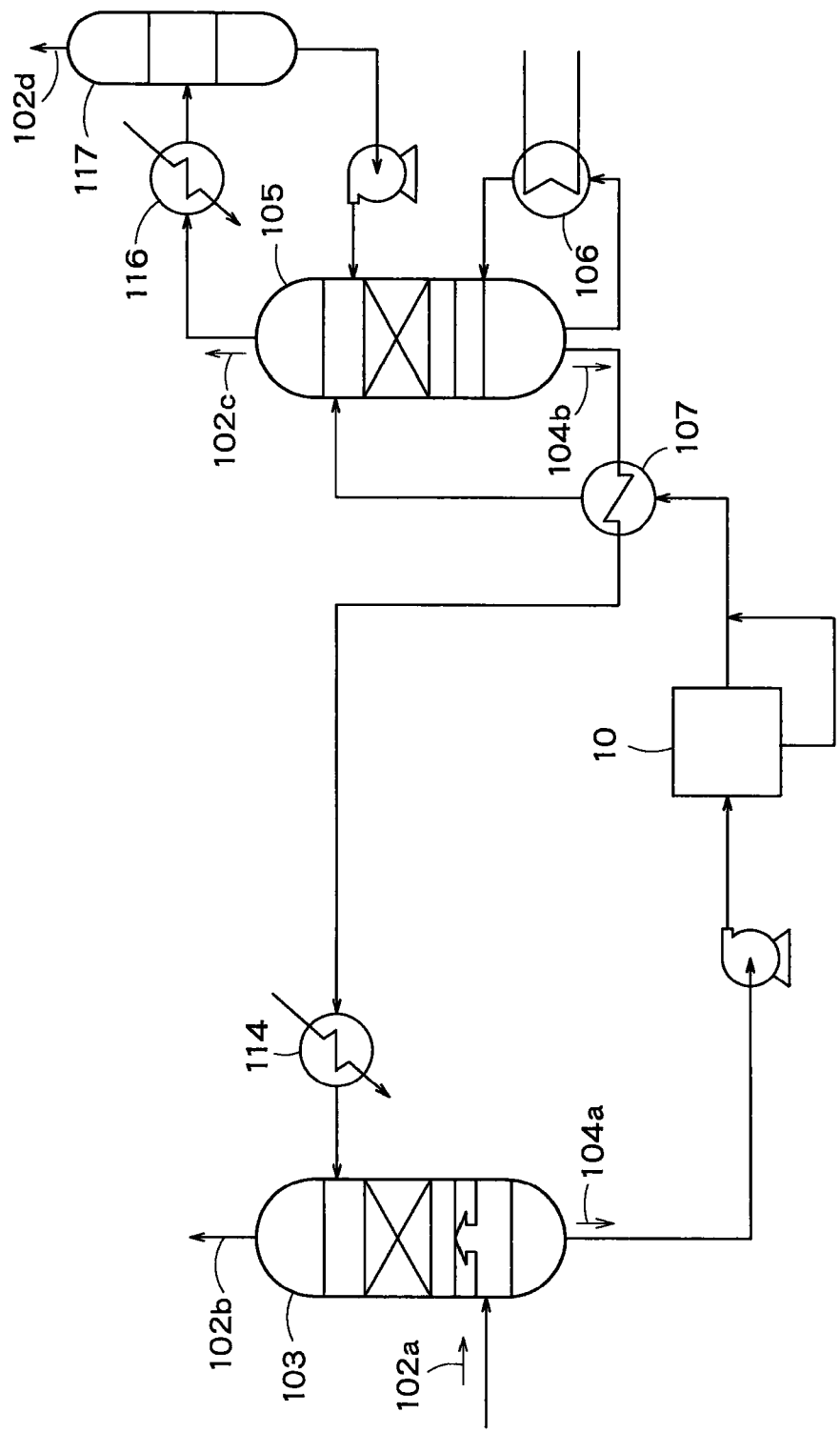
FIG. 4 is a schematic configuration diagram of a modification of the carbon dioxide separation and recovery apparatus.
Figure 5:
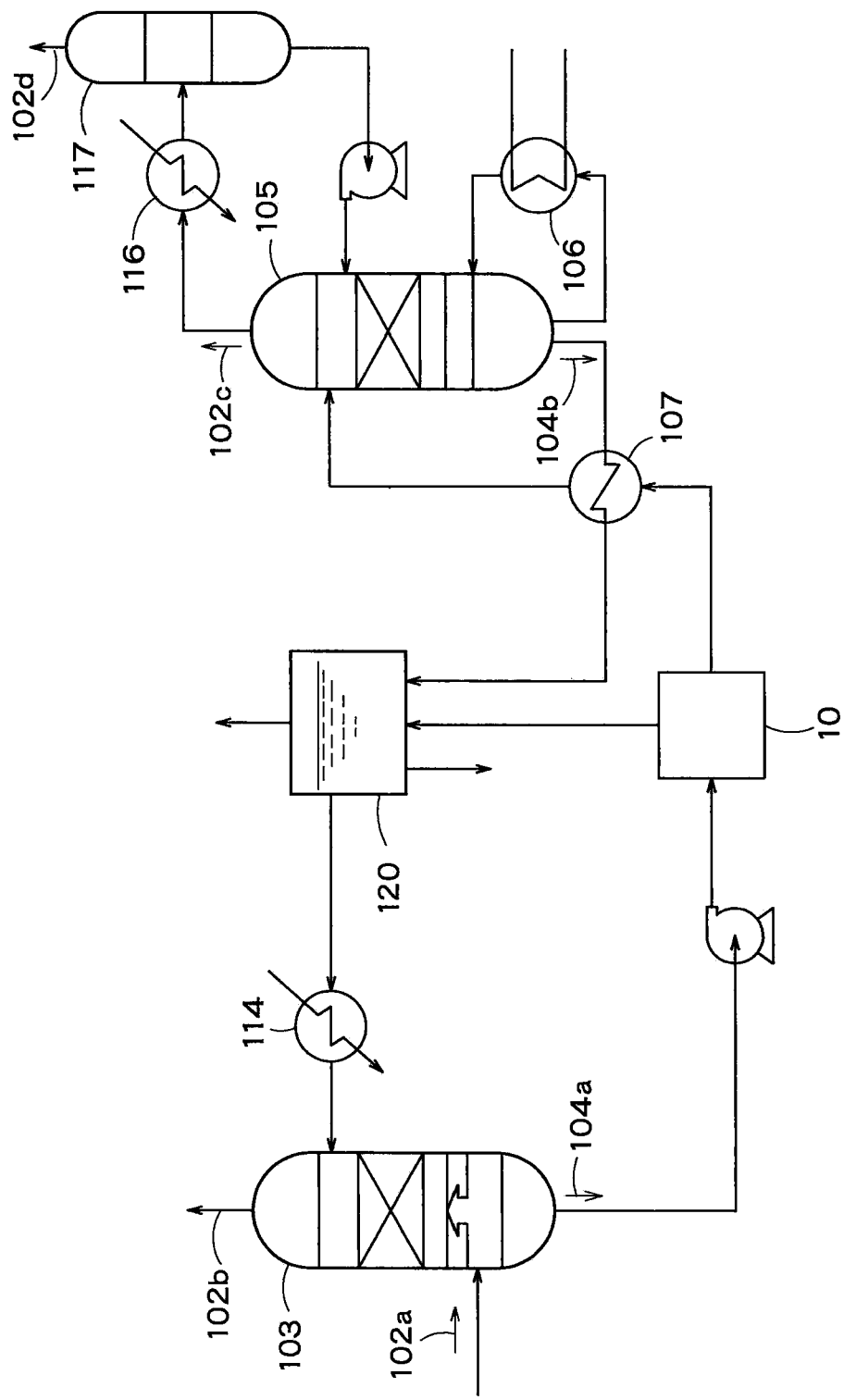
FIG. 5 is a schematic configuration diagram of a modification of the carbon dioxide separation and recovery apparatus.

When the oxygen collecting units 13 and 14 are regenerated, the absorbing liquid that has been recovered from the oxygen collecting units 13 and 14 can be returned to the system of the carbon dioxide separation and recovery apparatus 1 again. For example, as shown in FIG. 4, the absorbing liquid can be returned between the oxygen eliminating unit 10 and the regenerated heat exchanger 107. Alternatively, as shown in FIG. 5, the absorbing liquid can be returned to a buffer tank 120 provided between the regenerated heat exchanger 107 and the cooler 114.

Second Embodiment

Figure 6:
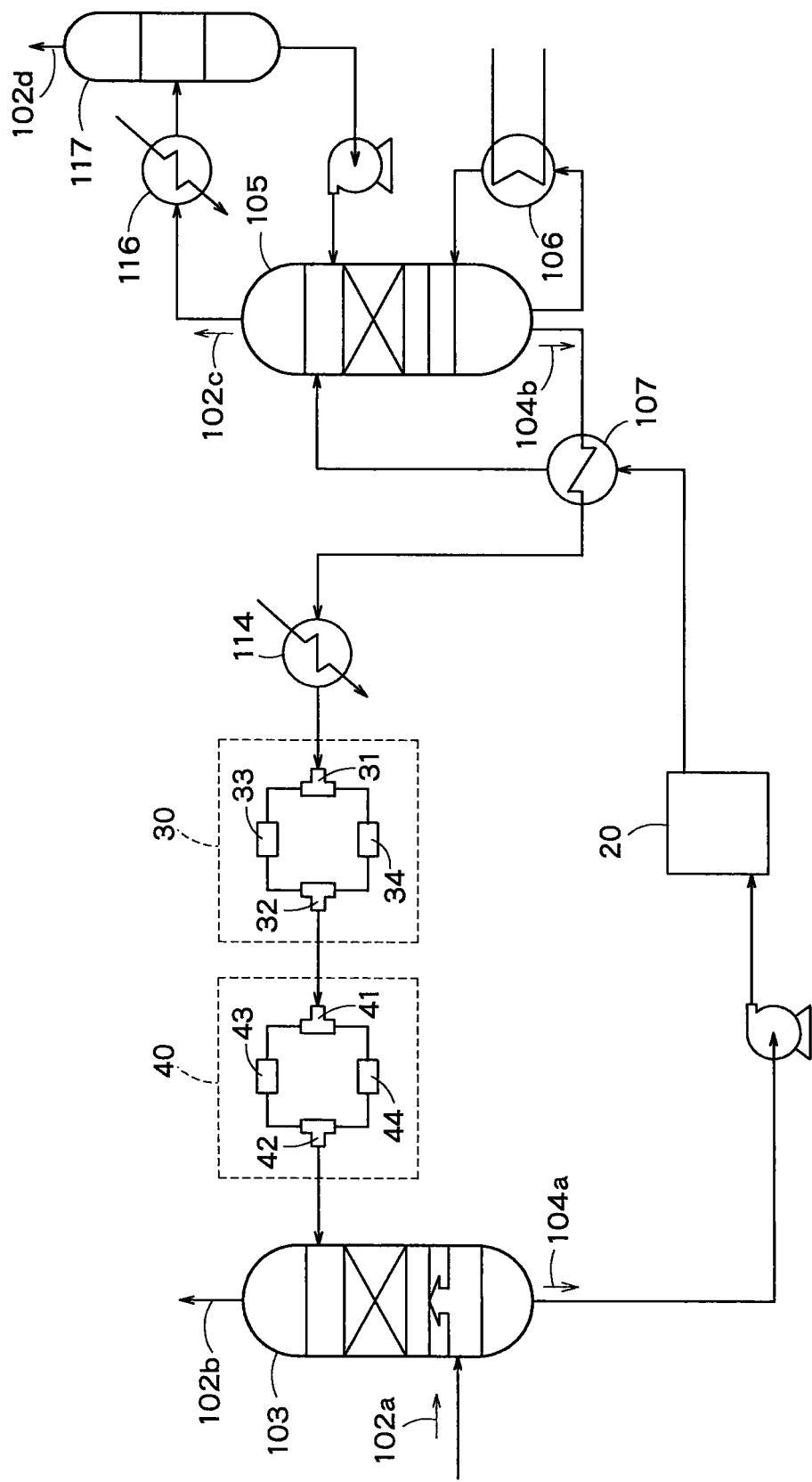
FIG. 6 is a schematic configuration diagram of a carbon dioxide separation and recovery apparatus according to a second embodiment of the present invention.

FIG. 6 shows a schematic configuration of a carbon dioxide separation and recovery apparatus according to the second embodiment of the present invention. In comparison to the first embodiment shown in FIG. 1, the different point is that the present embodiment omits the oxygen eliminating unit 10 and is provided with an oxidation reactor 20, a sulfate ion eliminating unit 30, and an organic acid anion eliminating unit 40. In FIG. 6, the same units as those of the first embodiment shown in FIG. 1 are denoted with the same reference numerals and the description thereof will be omitted.

The exhaust combustion gas 102a contains not only oxygen but also sulfur dioxide. The sulfur dioxide is absorbed into the absorbing liquid by the reaction: $SO_2+H_2O \rightarrow H^+ + HSO_3^-$ in the absorber 103. Accordingly, the rich liquid 104a contains the oxygen and the sulfurous acid.

Supplying the oxidation reactor 20 with the rich liquid 104a causes the reaction: $\frac{1}{2}O_2 + HSO_3^- \rightarrow H^+ + SO_4^{2-}$ in the oxidation reactor 20. The reaction fixes the dissolved oxygen as sulfate ions. This can prevent the oxygen from deteriorating the absorbing liquid. The oxidation reactor 20 is configured to temporarily store the absorbing liquid to cause the reaction and, for example, a tank can be used.

The carbon dioxide is eliminated from the rich liquid 104a that has been discharged from the oxidation reactor 20 in the regenerator 105.

The lean liquid 104b discharged from the regenerator 105 contains sulfate ions. After cooled in the cooler 114, the lean liquid 104b is supplied to the sulfate ion eliminating unit 30 to eliminate the sulfate ions therefrom.

After the sulfate ions are eliminated from the lean liquid 104b in the sulfate ion eliminating unit 30, the lean liquid 104b is supplied to the organic acid anion eliminating unit 40 to eliminate the organic acid anions therefrom. The lean liquid 104b is supplied to the absorber 103 after the organic acid anions are eliminated therefrom.

The sulfate ion eliminating unit 30 includes flow passage switching units 31 and 32, and ion-exchange resins 33 and 34. The ion-exchange resins 33 and 34 are for adsorbing the sulfate ions from the lean liquid 104b and, for example, a strongly basic anion-exchange resin can be used.

The flow passage switching unit 31 switches the supply destination of the lean liquid 104b to the ion-exchange resin 33 or 34. The flow passage switching unit 32 supplies the organic acid anion eliminating unit 40 with the lean liquid 104b that has been discharged from the ion-exchange resin 33 or 34. For example, a three-way valve can be used as the flow passage switching units 31 and 32.

The ion-exchange resin 34 can be regenerated by separating and eliminating the sulfate ions therefrom as the ion-exchange resin 33 adsorbs the sulfate ions from the lean liquid 104b. The ion-exchange resin 34 can be regenerated, for example, by injecting NaOH thereto. In the same manner, the ion-exchange resin 33 can be regenerated as the ion-exchange resin 34 adsorbs the sulfate ions from the lean liquid 104b.

The organic acid anion eliminating unit 40 includes flow passage switching units 41 and 42, and ion-exchange resins 43 and 44. The ion-exchange resins 43 and 44 are for adsorbing the sulfate ions in the lean liquid 104b and, for example, an anion-exchange resin can be used.

The flow passage switching unit 41 switches the supply destination of the lean liquid 104b to the ion-exchange resin 43 or 44. The flow passage switching unit 42 supplies the absorber 103 with the lean liquid 104b that has been discharged from the ion-exchange resin 43 or 44. For example, a three-way valve can be used as the flow passage switching units 41 and 42.

The ion-exchange resin 44 can be regenerated by separating and eliminating the organic acid anions therefrom as the ion-exchange resin 43 adsorbs the organic acid anions from the lean liquid 104b. The ion-exchange resin 44 can be regenerated, for example, by injecting NaOH thereto. In the same manner, the ion-exchange resin 43 can be regenerated as the ion-exchange resin 44 adsorbs the organic acid anions from the lean liquid 104b.

In such a manner, the dissolved oxygen in the absorbing liquid is eliminated by reacting the oxygen with sulfurous acid to fix the oxygen as sulfate ions. This prevents the absorbing liquid from having a decreased performance of carbon dioxide absorption in the embodiment. Further, eliminating the sulfate ions from the absorbing liquid can prevent the absorbing liquid from deteriorating and can prevent the structural materials of the carbon dioxide separation and recovery apparatus from corroding.

In the above-mentioned embodiment, the organic acid anion eliminating unit 40 is placed downstream of the sulfate ion eliminating unit 30 so that the sulfate ions can remove the organic acid anions that have been adsorbed onto the ion-exchange resin. Accordingly, it is preferable that the organic acid anion eliminating unit 40 be placed downstream of the sulfate ion eliminating unit 30.

The switching between the ion-exchange resins 33 and 34 that adsorb the sulfate ions can be performed at regular intervals in the sulfate ion eliminating unit 30. Further, a sensor can be provided to measure the sulfate ionic concentration of the lean liquid supplied from the sulfate ion eliminating unit 30 to the organic acid anion eliminating unit 40. When the value of the sulfate ionic concentration becomes higher than or equal to a predetermined value, the ion-exchange resin to be used is switched and the ion-exchange resin that has been used until that time can be regenerated.

The switching between the ion-exchange resins 43 and 44 that adsorb the organic acid anions can be performed at regular intervals in the organic acid anion eliminating unit 40. Further, a sensor can be provided to measure the formate ionic concentration of the lean liquid supplied from the organic acid anion eliminating unit 40 to the absorber 103. When the value of the formate ionic concentration becomes higher than or equal to a predetermined value, the ion-exchange resin to be used is switched and the ion-exchange resin that has been used until that time can be regenerated.

A rich liquid retaining unit in the lower side of the absorber 103 can be enlarged without providing the oxidation reactor 20 to retain the rich liquid for a period of time long enough to cause the reaction of the above-mentioned oxygen with sulfite ions although the oxidation reactor 20 is provided in the above-mentioned embodiment.

The sulfate ion eliminating unit 30 can be placed between the oxidation reactor 20 and the regenerated heat exchanger 107 as shown in FIG. 7 although the sulfate ion eliminating unit is placed downstream of the cooler 114 in the above-mentioned embodiment.

Assuming in the above-mentioned embodiment that the flow rate of the exhaust combustion gas 102a is Fg (mol/h), the circulating volume of the absorbing liquid in the carbon dioxide separation and recovery apparatus is Fl (mol/h), the oxygen partial pressure of the exhaust combustion gas 102a is $P_{O2}$ (atm), the oxygen solubility coefficient is k (mol/atm·mol), and the sulfur dioxide concentration of the exhaust combustion gas 102a is $C_{SO2}$ (mol/mol), when the expression:

$$C_{SO2} \geq 2kP_{O2}Fl/Fg \quad \text{(Expression 1)}$$

is satisfied, the reaction in the oxidation reactor 20 can fix all the dissolved oxygen in the absorbing liquid as sulfate ions.

Figure 8:
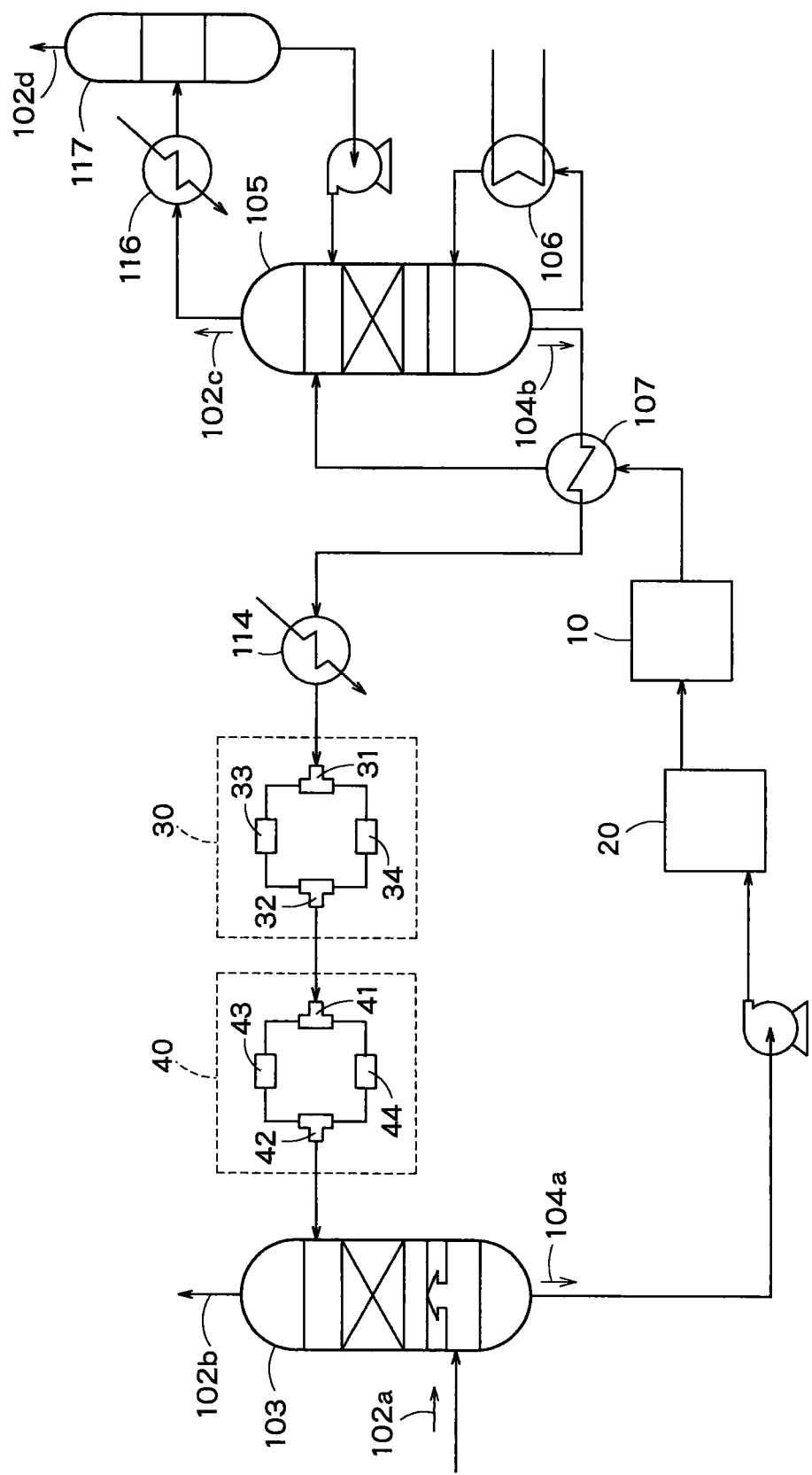
FIG. 8 is a schematic configuration diagram of a modification of the carbon dioxide separation and recovery apparatus.

On the other hand, when the above-mentioned expression 1 is not satisfied, in other words, when the reaction in the oxidation reactor 20 leaves, in the absorbing liquid, the oxygen that is not fixed as the sulfate ions, the oxygen eliminating unit 10 is preferably provided between the oxidation reactor 20 and the regenerated heat exchanger 107 to eliminate the oxygen from the absorbing liquid as shown in FIG. 8. The oxygen eliminating unit 10 has been described in the above-mentioned first embodiment. Such a configuration can eliminate the oxygen and sulfur dioxide from the absorbing liquid so that the absorbing liquid is prevented from deteriorating.

Figure 9:
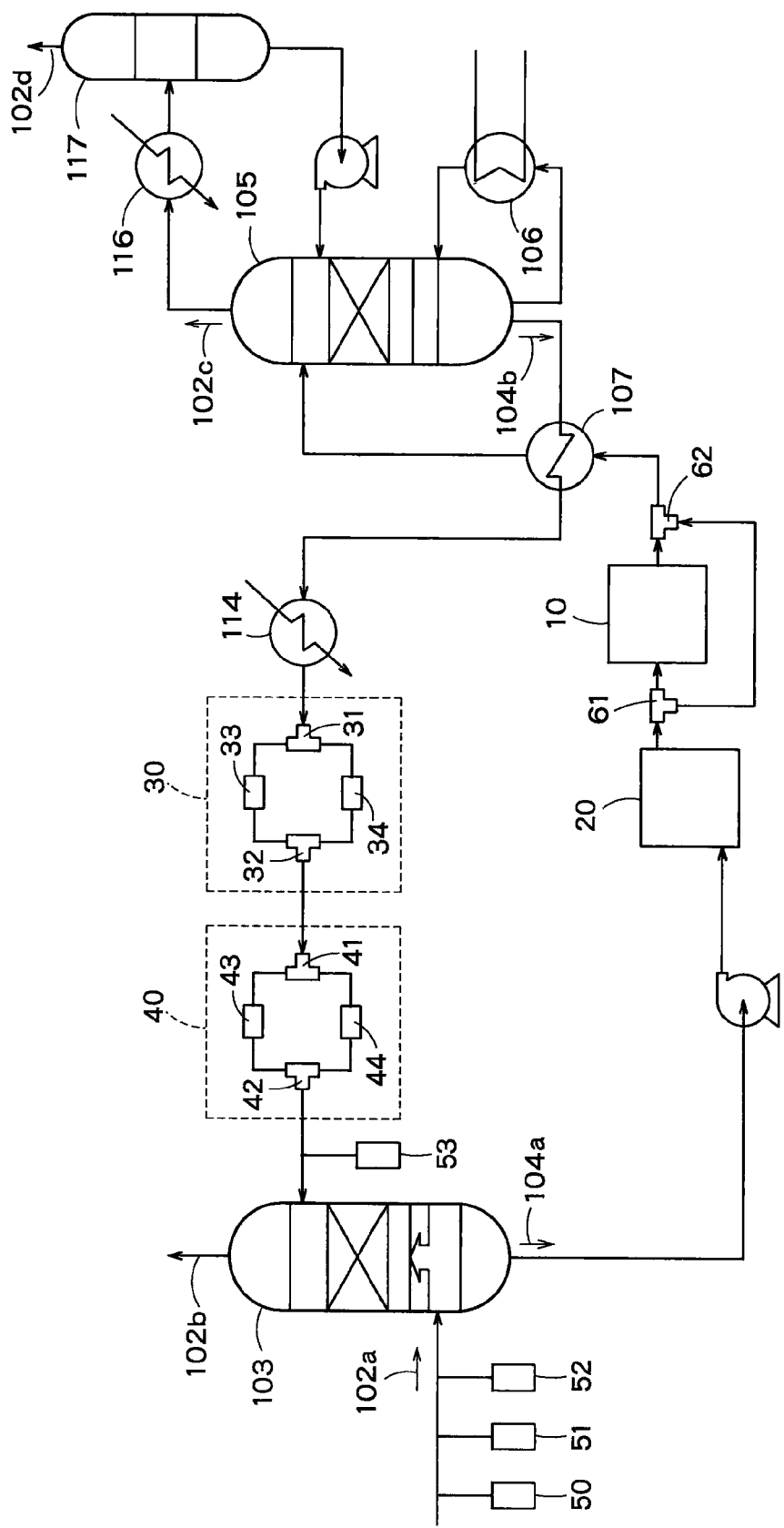
FIG. 9 is a schematic configuration diagram of a modification of the carbon dioxide separation and recovery apparatus.

As shown in FIG. 9, the carbon dioxide separation and recovery apparatus 1 can also include sensors 50, 51, 52 and 53, and flow passage switching units 61 and 62. The sensor 50 measures the flow rate Fg of the exhaust combustion gas 102a. The sensor 51 measures the oxygen partial pressure $P_{O2}$ of the exhaust combustion gas 102a. The sensor 52 measures the sulfur dioxide concentration $C_{SO2}$ of the exhaust combustion gas 102a. The sensor 53 measures the circulating volume Fl of the absorbing liquid in the carbon dioxide separation and recovery apparatus.

It is determined whether the results measured by the sensors 50 to 53 satisfy the above-mentioned expression 1. If the results are determined to satisfy the expression 1, the rich liquid 104a circulates while avoiding the oxygen eliminating unit 10 after discharged from the oxidation reactor 20.

On the other hand, if the results measured by the sensors 50 to 53 are determined not to satisfy the above-mentioned expression 1, the rich liquid 104a circulates through the oxygen eliminating unit 10 after discharged from the oxidation reactor 20.

In such a manner, the circulation route of the absorbing liquid can be properly switched using the results measured by the sensors 50 to 53.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A carbon dioxide separation and recovery apparatus comprising:
    an absorber making absorbing liquid absorb carbon dioxide contained in exhaust combustion gas, and discharging the absorbing liquid containing the carbon dioxide;
    a regenerator supplied with the absorbing liquid discharged from the absorber, eliminating carbon dioxide gas containing steam from the absorbing liquid, and regenerating and discharging the absorbing liquid;
    a regenerated heat exchanger placed between the absorber and the regenerator and using the absorbing liquid discharged from the regenerator and supplied to the absorber as a heat source to heat the absorbing liquid discharged from the absorber and supplied to the regenerator; and
    an oxygen eliminating unit eliminating oxygen from the absorbing liquid supplied from the absorber to the regenerator and including,
        a first collecting unit and a second collecting unit collecting the oxygen contained in the absorbing liquid,
        a first flow passage switching unit supplying the absorbing liquid discharged from the absorber to the first collecting unit or the second collecting unit,
        a second flow passage switching unit supplying the absorbing liquid discharged from the first collecting unit or the second collecting unit to the regenerated heat exchanger, and
        a regenerating unit recovering the oxygen collected in the second collecting unit in the case where the first flow passage switching unit supplies the first collecting unit with the absorbing liquid, and recovering the oxygen collected in the first collecting unit in the case where the first flow passage switching unit supplies the second collecting unit with the absorbing liquid.

2. The carbon dioxide separation and recovery apparatus according to claim 1, wherein the regenerating unit recovers the absorbing liquid from the first collecting unit or the second collecting unit before recovering the oxygen and adds the recovered absorbing liquid into the absorbing liquid circulating through the carbon dioxide separation and recovery apparatus.

3. The carbon dioxide separation and recovery apparatus according to claim 1, wherein the first collecting unit and the second collecting unit include silver.

4. The carbon dioxide separation and recovery apparatus according to claim 3, wherein the first collecting unit and the second collecting unit are heated when the regenerating unit recovers the oxygen.

5. The carbon dioxide separation and recovery apparatus according to claim 4, wherein the regenerating unit receives water vapor from a reboiler heating a part of the absorbing liquid stored in the regenerator, and heats the first collecting unit and the second collecting unit by using the water vapor.

6. The carbon dioxide separation and recovery apparatus according to claim 1, wherein the first collecting unit and the second collecting unit include an iron fiber.

7. A carbon dioxide separation and recovery apparatus comprising:
an absorber making absorbing liquid absorb carbon dioxide contained in exhaust combustion gas, and discharging the absorbing liquid containing the carbon dioxide;
a regenerator supplied with the absorbing liquid discharged from the absorber, eliminating carbon dioxide gas containing steam from the absorbing liquid, and regenerating and discharging the absorbing liquid;
a regenerated heat exchanger placed between the absorber and the regenerator and using the absorbing liquid discharged from the regenerator and supplied to the absorber as a heat source to heat the absorbing liquid discharged from the absorber and supplied to the regenerator;
a reactor placed between the absorber and the regenerated heat exchanger, storing the absorbing liquid supplied from the absorber to the regenerator, and generating a sulfate ion by a reaction of the oxygen contained in the absorbing liquid with a sulfite ion;
a first eliminating unit eliminating the sulfate ion from the absorbing liquid containing the sulfate ion; and
a second eliminating unit placed between the regenerated heat exchanger and the absorber, and eliminating an organic acid anion from the absorbing liquid discharged from the regenerator and having the sulfate ion eliminated therefrom.

8. The carbon dioxide separation and recovery apparatus according to claim 7, wherein the first eliminating unit is placed between the reactor and the regenerated heat exchanger or between the regenerated heat exchanger and the second eliminating unit.

9. The carbon dioxide separation and recovery apparatus according to claim 7, wherein the first eliminating unit includes two ion-exchange resins adsorbing the sulfate ion in the absorbing liquid to separate and eliminate the sulfate ion adsorbed onto one of the ion-exchange resins as the other ion-exchange resin is supplied with the absorbing liquid.

10. The carbon dioxide separation and recovery apparatus according to claim 7, wherein the second eliminating unit includes two ion-exchange resins adsorbing the organic acid anion in the absorbing liquid to separate and eliminate the organic acid anion adsorbed onto one of the ion-exchange resins as the other ion-exchange resin is supplied with the absorbing liquid.

11. The carbon dioxide separation and recovery apparatus according to claim 9, wherein the ion-exchange resins are anion-exchange resins.

12. A carbon dioxide separation and recovery apparatus comprising:
an absorber making absorbing liquid absorb carbon dioxide contained in exhaust combustion gas, and discharging the absorbing liquid containing the carbon dioxide;
a regenerator supplied with the absorbing liquid discharged from the absorber, eliminating carbon dioxide gas containing steam from the absorbing liquid, and regenerating and discharging the absorbing liquid;
a regenerated heat exchanger placed between the absorber and the regenerator and using the absorbing liquid discharged from the regenerator and supplied to the absorber as a heat source to heat the absorbing liquid discharged from the absorber and supplied to the regenerator;
a reactor placed between the absorber and the regenerated heat exchanger, storing the absorbing liquid supplied from the absorber to the regenerator, and generating a sulfate ion by a reaction of the oxygen contained in the absorbing liquid with a sulfite ion;
a first eliminating unit eliminating the sulfate ion from the absorbing liquid containing the sulfate ion;
a second eliminating unit placed between the regenerated heat exchanger and the absorber, and eliminating an organic acid anion from the absorbing liquid discharged from the regenerator and having the sulfate ion eliminated therefrom; and
a third eliminating unit including,
a first collecting unit and a second collecting unit collecting the oxygen contained in the absorbing liquid discharged from the reactor,
a first flow passage switching unit supplying the first collecting unit or the second collecting unit with the absorbing liquid discharged from the reactor,
a second flow passage switching unit supplying the regenerated heat exchanger with the absorbing liquid discharged from the first collecting unit or the second collecting unit, and
a regenerating unit recovering the oxygen collected in the second collecting unit in the case where the first flow passage switching unit supplies the first collecting unit with the absorbing liquid, and recovering the oxygen collected in the first collecting unit in the case where the first flow passage switching unit supplies the second collecting unit with the absorbing liquid.

13. The carbon dioxide separation and recovery apparatus according to claim 12, further comprising:
a first sensor measuring a flow rate of the exhaust combustion gas;
a second sensor measuring an oxygen partial pressure of the exhaust combustion gas;
a third sensor measuring a sulfur dioxide concentration of the exhaust combustion gas;
a fourth sensor measuring a circulating volume of the absorbing liquid in the carbon dioxide separation and recovery apparatus; and
a third flow passage switching unit switching, based on the results measured by the first to fourth sensors, whether the absorbing liquid discharged from the reactor is supplied to the regenerated heat exchanger through the third eliminating unit or supplied to the regenerated heat exchanger while avoiding the third eliminating unit.

14. The carbon dioxide separation and recovery apparatus according to claim 13, wherein, assuming that the flow rate is Fg (mol/h), the oxygen partial pressure is $P_{O2}$ (atm), an oxygen solubility coefficient is k (mol/atm·mol), the sulfur dioxide concentration is $C_{SO2}$ (mol/mol), and the circulating volume of the absorbing liquid is Fl (mol/h), the third flow passage switching unit supplies the absorbing liquid discharged from the reactor to the regenerated heat exchanger while avoiding the third eliminating unit when an expression: $C_{SO2} \geq 2kP_{O2}Fl/Fg$ is satisfied, and supplies the absorbing liquid discharged from the reactor to the regenerated heat exchanger through the third eliminating unit when the expression is not satisfied.

* * * * *